TELEVISION SIGNAL MIXING CIRCUIT

Filed Sept. 20, 1947

Inventor:
Vernon J. Duke

By Samuel B. Smith
ATTORNEY

Patented Sept. 18, 1951

2,568,541

UNITED STATES PATENT OFFICE 2,568,541

TELEVISION SIGNAL MIXING CIRCUIT

Vernon J. Duke, Rockville Centre, N. Y., assignor to Radio Corporation of America, a corporation of Delaware Application September 20, 1947, Serial No. 775,181

3 Claims. (Cl. 178—7.2)

Figures 1, 2:
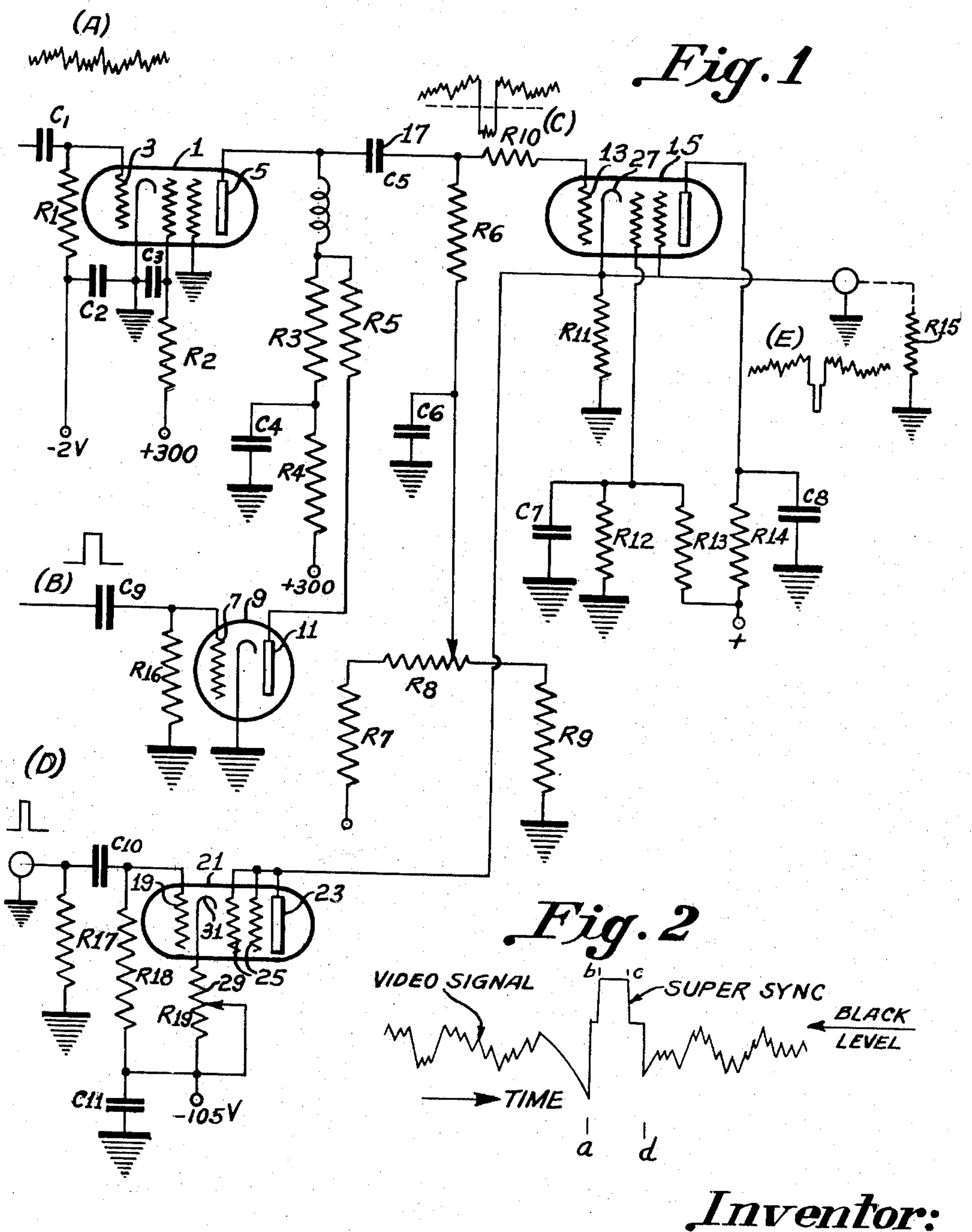

This invention relates to improvements in the electrical signal mixing circuits and more particularly to circuit arrangements for combining video signals with associated blanking impulses and super sync.

The well-known scanning operation employed almost universally for the transmission and reproduction of images by electricity obviously requires not only exact synchronism throughout the system, but requires accurate level or brilliance control together with "blanking" during the retrace time interval occupied by the scanning element.

The well-known system of synchronism and blanking adopted as standard by the R. M. A. Television Committee provides for a blanking "pedestal" representing black level and having superimposed thereon a synchronizing pulse of shorter time duration than the blanking impulses, and thus producing what is commonly known as a "front porch" immediately preceding the synchronizing pulse, and a "back porch" on the blanking pedestal immediately following the synchronizing pulse. The synchronizing pulse is frequently referred to as "super sync."

There have been a number of successful proposals for generating in combination with the video signal the required blanking impulses and synchronizing pulses. Some difficulty, however, has been experienced from noise interference in maintaining an undistorted front and back porch.

Still another difficulty has been experienced in the operation of systems heretofore proposed, in that very often the mixing of super sync and video signals, together with blanking impulses, causes distorted black level, that is, distorted front and back porch resulting from a mutual reactance or interference.

According to this invention, a circuit arrangement is provided wherein the super sync, the blanking impulses and video signal are combined in such a way that their amplitudes are not mutually related, and an undistorted front and back porch is provided in the resultant combined signal.

A primary object of this invention is to provide an improved television system.

Another object of this invention is to provide for improved brightness control and synchronization of television images.

Still another object of this invention is to provide for undistorted black level of television signals.

Other and incidental objects of the invention will be apparent to those skilled in the art from a reading of the following specification and an inspection of the accompanying drawing in which Figure 1 shows by circuit diagram one form of this invention; and Figure 2 illustrates graphically a typical television signal including a video signal, a blanking impulse and a synchronizing pulse.

Turning now in more detail to Figure 1, there is shown an electron discharge tube 1 having a control electrode 3 and anode 5.

A video signal A is impressed upon control electrode 3 with signals corresponding to black in the image extending in a positive direction.

The video signal A may, for example, be obtained from a television camera such as, for example, the image orthicon camera. The image orthicon camera is shown and described in detail in an article entitled "Image Orthicon Camera," by R. D. Kell and G. C. Sziklai, published in "RCA Review" for March, 1946. An iconoscope or a light beam scanning device may also be employed at the source of the video signal A. It is obvious, therefore, that any type device may be employed for supplying the video signals without departing from the spirit of this invention. It is also possible to employ signals other than video signals with which it is desired to combine recurring pulses.

The associated blanking impulse B is inserted in the system at control electrode 7 of tube 9. The blanking impulse from anode 11 or output circuit of tube 9 is combined with the video signal A in the output circuit of tube 1, resulting in a wave form as represented, for example, by the curve C.

Tube 15 is preferably a screen grid tube having a sharp cut-off characteristic. The grid-cathode bias potential of tube 15 is determined by the setting of the potentiometer R8 that is included in the potential divider R7, R8 and R9 connected in series between a source of negative potential and ground. The potentiometer R8 is normally so adjusted as to clip the composite video and blanking wave form C at a level corresponding to black in the image, and this level is represented by the dotted line associated with the composite wave form C of Figure 1. Any negative potential excursion beyond this level results in driving tube 15 to cut-off, and such a condition prevails during each blanking interval.

It will be seen that the blanking impulse B is polarized in a positive direction, causing control electrode 7 of tube 9 to go positive during the blanking impulse, thus resulting in a potential change in a negative direction at the anode 11 of tube 9. This blanking impulse of negative polarity is transmitted to control electrode 13 of tube 15 through coupling condenser 17, and is always of sufficient intensity to drive tube 15 well beyond cut-off during the interval of the blanking impulse B.

A super sync impulse illustrated by D is impressed on the circuit by its application to the control electrode 19 of tube 21. The output circuit of tube 21 (which may, for example, be its anode 23 connected in parallel with auxiliary grids 25) is connected to the cathode 27 of tube 15, which also serves as the output circuit of tube 15.

In order that tube 21 will be at cut-off or below, except during time of insertion of the sync impulse, it is necessary that pulse D, operating with its grid leak-condenser combination of tube 21, be of sufficient amplitude to cause sufficient current to flow in the grid circuit of tube 21 to bias that tube to cut-off, except when its pulse is present. The time constant of C10–R18 is long, as compared with the intervals between sync impulses.

It will be seen that the super sync D is polarized in a positive direction. It follows that the application of the super sync D to control electrode 19 will cause the potential of anode 23 to change in a negative direction. It will be noticed that a negative potential of 105 volts, as illustrated, is connected through a potentiometer 29 to cathode 31 of tube 21. The change in potential of anode 23 in a negative direction causes the potential of cathode 27 also to change in a negative direction. Even though super sync is injected into the cathode of tube 15 in a negative direction, tube 15 is still held in a non-conducting condition by the negative blanking impulse present at that time at the control electrode of that tube. Accordingly, during the time occupied by the front and the back porch of the blanking impulse, the potential of the cathode 27 of tube 15 is at zero potential by reason of the fact that, during the time intervals corresponding to blanking, tube 15 is non-conducting. During the time intervals of super sync, the cathode 27 is driven negative with respect to ground.

The operation of the circuit shown in Figure 1 may better be understood after a brief reference to a standard composite television signal illustrated in Figure 2.

The video signal illustrated is interrupted between time "*a–d*" by the insertion of a blanking pedestal which establishes the black level of the television image.

Superimposed on the blanking pedestal, there is positioned the synchronizing signal or super sync, whose leading edge at time "*b*" is employed for synchronization of the scanning operation. It will be seen that, because of the fact that the time interval "*b–c*" occupied by the sync signal is less than the time interval "*a–d*" occupied by the blanking pedestal, there results a front porch "*a–b*" and a back porch "*c–d*."

Returning now to the circuit diagram shown in Figure 1, the viedo signal A is interrupted in curve C by the blanking impulse B.

During the time interval "*a–d*" occupied by the blanking impulse B, tube 15 is inoperative because of the fact that its control electrode 13 is driven beyond cut-off in a negative direction by the corresponding drop in potential of anode 11 of tube 9, as explained above.

During the super sync D occupying time interval "*b–c*" of Figure 2, the potential of cathode 27 is dropped in a negative direction by reason of the less positive potential of anode 23 of tube 21, as explained above. This results in a signal as shown at E. At the output terminal, therefore, video signals representing white in the image extend in a positive potential direction with respect to ground, while super sync extends in a negative direction with respect to ground. Black level and blanking are at ground potential.

It will be seen that, during the two periods "*a–b*" and "*c–d*," there will be zero voltage and zero current output from tubes 15 and 21, and therefore no distorted pedestal or tilt of pedestal can occur. Inasmuch as tubes 15 and 21 are not operative during the same periods, there is no tendency for inter-action in such a manner as to cause super sync to vary with image signal intensity or brightness.

Although it is not intended that this invention should be limited to the illustrative potentials indicated on the circuit diagram or any particular values and resistances and capacities, or the tubes suggested, the following table is provided as one possible set of values which may be employed for proper operation of the circuit shown in Figure 1:

| | |
|---|---|
| $C_1$–.1 mfd. | $R_1$—120,000 ohms |
| $C_2$–.05 mfd. | $R_2$—68,000 ohms |
| $C_3$–10 mfd. | $R_3$—1,000 ohms |
| $C_4$–20 mfd. | $R_4$—10,000 ohms |
| $C_5$–.1 mfd. | $R_5$—5,600 ohms |
| $C_6$–1 mfd. | $R_6$—120,000 ohms |
| $C_7$–10 mfd. | $R_7$—10,000 ohms |
| $C_8$–20 mfd. | $R_8$—25,000 ohms |
| $C_9$–.1 mfd. | $R_9$—10,000 ohms |
| $C_{10}$–.1 mfd. | $R_{10}$—50 ohms |
| $C_{11}$–1 mfd. | $R_{11}$—220 ohms |
| | $R_{12}$—22,000 ohms |
| | $R_{13}$—22,000 ohms |
| | $R_{14}$—1,000 ohms |
| | $R_{15}$—75 ohms |
| Tube **1**—6AC7 | $R_{16}$—1 megohm |
| Tube **15**—6SH7 | $R_{17}$—75 ohms |
| Tube **9**—6SN7 | $R_{18}$—2.2 megohms |
| Tube **21**—6AC7 | $R_{19}$—1,000 ohms |

Having thus described the invention, what is claimed is:

1. In a television system, a scanning control signal circuit for combining blanking impulses, super sync and video signals, comprising a first normally conductive electron discharge tube having a cathode output circuit and having a control electrode, a second normally non-conductive electron discharge tube having a control electrode, means for receiving and delivering blanking impulses, super sync and video signals at respective output terminals, means responsive during the reception of blanking impulses by the control electrode of said second tube for causing said second tube to be conductive, and means for applying the output of said second tube to render said first tube non-conductive, and means for inserting said super sync impulses in said cathode output circuit of said first tube during the interval that said first tube is non-conducting.

2. In a television system, a scanning control signal circuit for combining blanking impulses, sync and video signals, comprising in combination, a first electron discharge tube having a cathode follower type output circuit and having a control electrode, means for applying video signal to said control electrode, a normally non-conductive second electron discharge tube connected in shunt with the control electrode of said first tube, said second electron discharge tube having a control electrode, means for applying blanking impulses to said second electron discharge tube control electrode, tube biasing means responsive during the reception of blanking impulses by the control electrode of said second tube for causing said second tube to be conductive, a normally non-conductive third electron discharge tube having an output circuit and having a control electrode, means for applying super sync signals to the control electrode of said third tube so as to render it conductive only during super sync signals and a connection connecting the output circuit of said third tube and said cathode follower type output circuit of said first tube in parallel.

3. In a television wave synthesizing system a voltage datum terminal, a first supply terminal designated to deliver video signal with black picture signal information extending in the negative direction with respect to said datum terminal, a record supply terminal designated to deliver blanking signal extending in a positive direction relative to said datum terminal, a third supply terminal designated to deliver sync signals extending in a positive direction relative to said datum terminal, a first electron discharge tube having at least a control electrode, cathode and anode, a resistance connected from said cathode to said datum terminal, a capacitor connected from said first supply terminal to said control electrode, a record electron discharge tube having at least control electrode and anode, means for coupling said record supply terminal to said record tube control electrode, coupling means between said record tube anode and said first tube control electrode, said blanking signal being so valued as to drive said first tube to anode current cut off only during said blanking signal, a third electron discharge tube having at least an anode, cathode and control electrode and so operated so as to be normally non-conducting, a negative voltage terminal adapted to supply a negative voltage relative to said datum terminal, a connection from said third tube cathode to said negative voltage terminal, coupling from said third supply terminal to said third tube control electrode so as to drive said third tube into conduction during synchronizing signal and a direct connection from said third tube anode to said first tube cathode.

VERNON J. DUKE.

REFERENCES CITED

The following references are of record in the file of this patent:

UNITED STATES PATENTS

| Number | Name | Date |
|---|---|---|
| 1,877,825 | Doak | Sept. 20, 1932 |
| 2,171,536 | Bingley | Sept. 5, 1939 |
| 2,249,942 | Campbell | July 22, 1941 |
| 2,298,796 | Kell | Oct. 13, 1942 |
| 2,363,809 | Schade | Nov. 28, 1944 |
| 2,445,040 | Schade | July 13, 1948 |
| 2,471,903 | Schade | May 31, 1949 |